Sept. 25, 1956 P. P. RUPPE 2,764,276
FRAME STRUCTURE FOR ENDLESS CONVEYORS
Filed Feb. 25, 1953 3 Sheets-Sheet 2
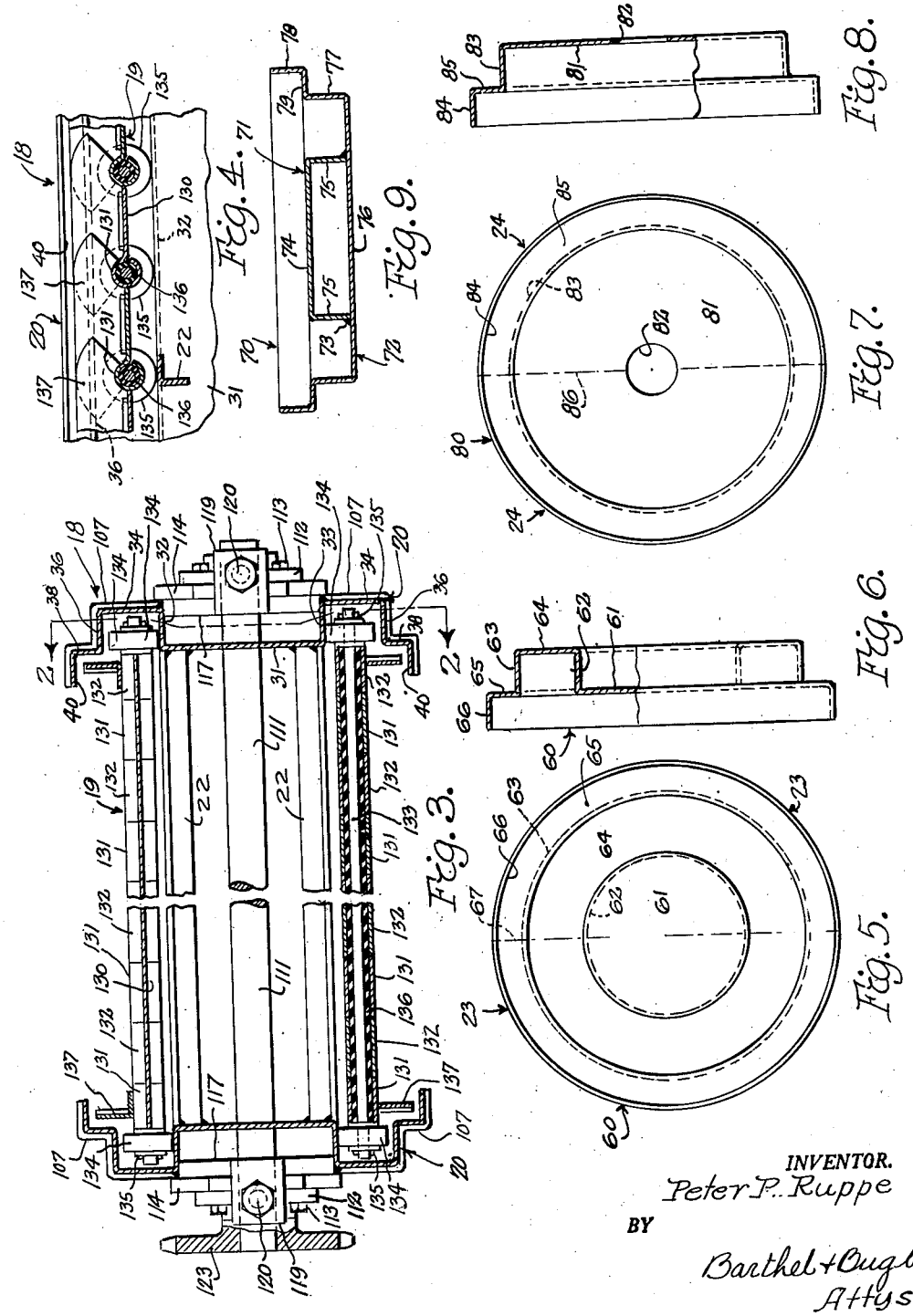
INVENTOR.
Peter P. Ruppe
BY
Barthel + Bugbee
Attys Sept. 25, 1956  P. P. RUPPE  2,764,276
FRAME STRUCTURE FOR ENDLESS CONVEYORS
Filed Feb. 25, 1953  3 Sheets-Sheet 3
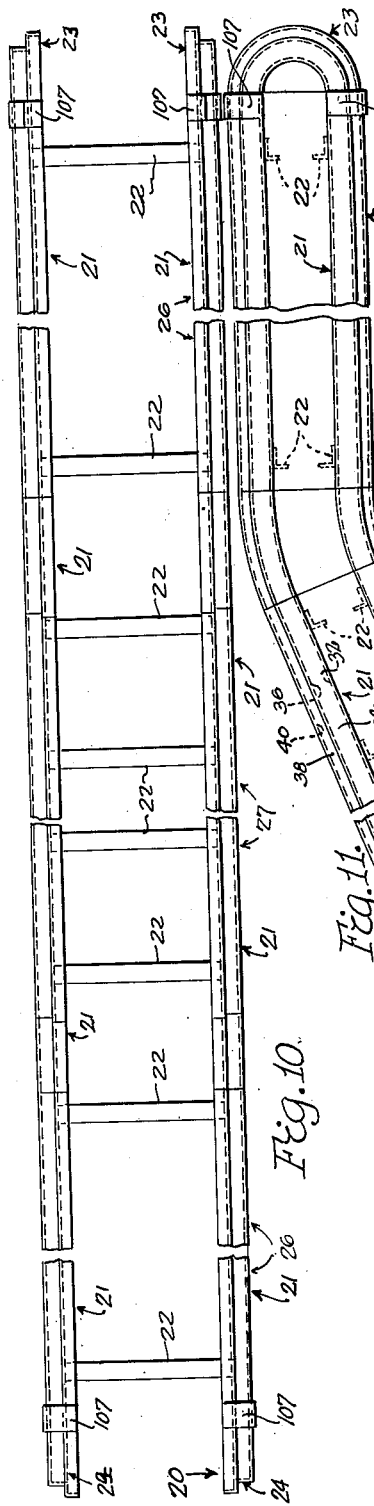
INVENTOR.
Peter P. Ruppe
BY
Barthel + Bugbee
Attys

United States Patent Office 2,764,276
Patented Sept. 25, 1956

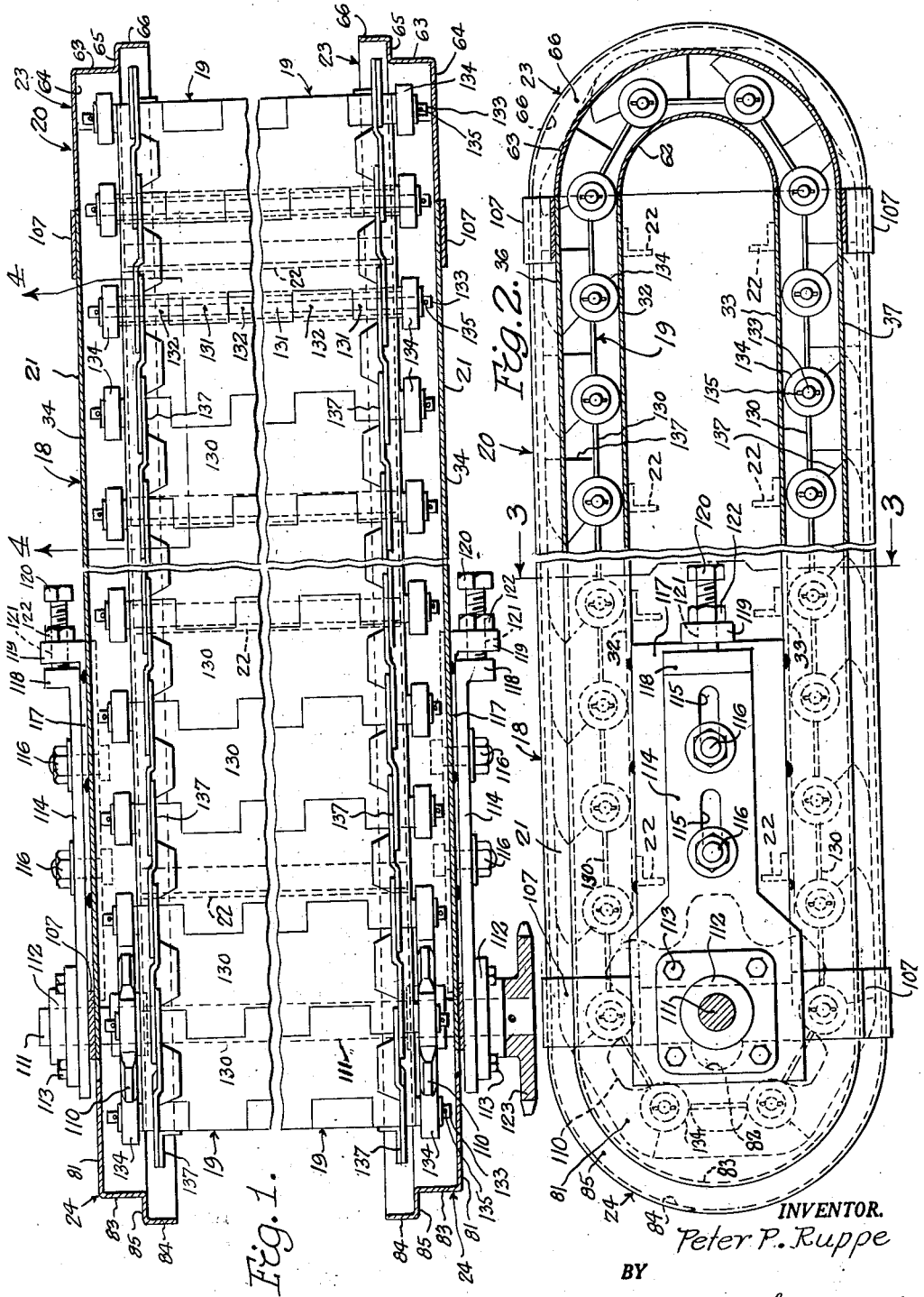

2,764,276
FRAME STRUCTURE FOR ENDLESS CONVEYORS
Peter P. Ruppe, Grosse Pointe Woods, Mich.

Application February 25, 1953, Serial No. 338,645

6 Claims. (Cl. 198—184)

This invention relates to conveyors and, in particular, to frame structures for supporting endless conveyors.

One object of this invention is to provide an improved frame structure for supporting endless conveyors, the structure being so formed as to be capable of manufacture by simple and inexpensive bending, rolling or welding operations, thereby considerably reducing the cost of the conveyor and simplifying its construction.

Another object is to provide an endless conveyor supporting structure of the foregoing character wherein the end portions of the structure are cut from end bells formed by spinning, and wherein the straight sections are formed in a bending brake or by dies or by rolling operations from sheet metal, these straight sections being formed either in a single piece or as a weldment from separate pieces.

Another object is to provide an endless conveyor supporting structure of the foregoing character having straight horizontal sections on different levels interconnected by inclined sections, the junctions between the horizontal sections and the inclined sections being formed by arcuate portions cut from circular blanks so as to enable a single blank to produce several such junction portions.

Other objects and advantages of the invention will become apparent during the course of the following description of the accompanying drawings, wherein:

Figure 1 is a top plan view, partly in horizontal section, of an endless conveyor employing a supporting structure made according to one form of the invention;

Figure 2 is a side elevation, partly in vertical section, of the conveyor shown in Figure 1;

Figure 3 is a vertical cross-section taken along the line 3—3 in Figure 2;

Figure 4 is a vertical longitudinal section taken along the line 4—4 in Figure 1;

Figure 5 is a rear elevation of a circular blank from which are cut the end portions for the supporting structure at one end of the conveyor;

Figure 6 is a left-hand side elevation, partly in central vertical section, of the circular blank shown in Figure 5;

Figure 7 is a rear elevation of a circular blank from which are cut the end portions for the supporting structure at the opposite end of the conveyor;

Figure 8 is a left-hand side elevation, partly in central vertical section, of the circular blank shown in Figure 7;

Figure 9 is a horizontal section through a modification of the circular blank shown in Figures 5 and 6, formed as a weldment combining two separate pieces;

Figure 10 is a top plan view of an endless conveyor supporting structure operating between two levels, according to the invention;

Figure 11 is a side elevation of the endless conveyor supporting structure shown in Figure 10;

Figure 12 is a perspective view of a portion of one of the straight sections of the supporting structure shown in Figures 10 and 11;

Figure 13 is a vertical section through a modification of Figure 12, constructed as a weldment combining two separate pieces;

Figure 14 is a front elevation of a circular blank from which are cut junctions for the inclined sections of the conveyor supporting structure of Figures 10 and 11, the lower portion thereof being omitted for conserving space in the drawing; and Figure 15 is a horizontal section taken along the line 15—15 in Figure 14.

Referring to the drawings in detail, Figures 1 to 4 inclusive show an endless hinge link belt conveyor installation, generally designated 18, according to one form of the invention, as embodying an endless conveyor unit, generally designated 19, mounted in a conveyor supporting structure, generally designated 20. The endless conveyor unit 19 is of any suitable type such as the type shown, for example, in the application of Ruppe and Bodycombe, Serial No. 302,212, filed August 1, 1952 and now abandoned for Hinged Link Belt Conveyor. It will be understood, however, that the present invention is directed to the conveyor supporting structure 20 and hence that various different types of endless conveyors may be mounted in the conveyor supporting structure 20 of the present invention.

The conveyor supporting structure 20 consists generally of two oppositely-facing side units or assemblies 21 interconnected by cross members 22 welded or otherwise suitably secured thereto. Each side unit 21 consists generally of opposite end sections 23 and 24, and an intermediate section 25 to 29, inclusive, interconnecting said end sections, said intermediate sections including horizontal straight sections 25 and 26 adjacent the end sections 23 and 24 respectively, and optional inclined sections 27 employed where the horizontal sections 25 and 26 are on different levels (Figure 11) in which case the foregoing sections are interconnected by sector-shaped lower and upper junction sections 28 and 29. The straight sections 25, 26 and 27 are of substantially the same construction shown in Figure 12 and are cut from elongated members, generally designated 30, which are most conveniently manufactured by rolling operations on sheet metal stock. The elongated straight members 30 consist of flat vertical central portions 31 having inner perpendicular upper and lower bent portions 32 and 33 extending outwardly therefrom, upper and lower vertical portions 34 and 35, upper and lower inwardly-bent portions 36 and 37, upper and lower outer side portions 38 and 39 disposed substantially in the same plane as the central side portions 31, and upper and lower horizontal flange portions 40 and 41 bent inwardly from the portions 38 and 39. Thus, in effect, the member 30 consists of a central outwardly-facing channel member having upper and lower inwardly-facing channel members integral therewith and terminating at their upper and lower edges in angle members, also integral therewith.

The modified side member, generally designated 42 (Figure 13) is generally similar in construction to the side member 30 except that it is formed as a weldment combining an inner channel member 43 having its flanges 44 and 45 welded as at 46 to the web 47 of an outer channel member 48, the web 47 being parallel to the web 49 of the inner channel member 43 and the flanges 50 and 51 of the outer channel member 48 being parallel to the flanges 44 and 45 of the inner channel member 43. As before, the outer channel member 48 has upper and lower outer side portions 52 and 53 corresponding to the portions 38 and 39 of Figure 12, and flange portions 54 and 55 corresponding to the flange portions 40 and 41.

The end section 23 of the conveyor supporting structure 20 is formed from a circular blank 60 (Figures 5 and 6) having an inner side wall 61, inner and outer perpendicular walls 62 and 63 interconnected by an outer wall 64 (Figure 6), an outer side wall 65 and an outer flange 66. The blank 60 is formed with such dimensions that its various portions line up with the corresponding portions of the side member 30 from which the various side sections 25, 26 and 27 are formed. The blank 60 is made preferably by spinning operations upon a disc of sheet metal and cut in half along the dotted line 67 to form a pair of end portions 23 for the opposite sides of the supporting structure 20 at the driving end of the conveyor.

The modified blank 70 (Figure 9) is similar in construction to the one-piece blank 60 except that it is made up as a weldment from oppositely-facing inner and outer cupped circular members 71 and 72 welded together as at 73. The inner cupped member 71 has a bottom wall 74 and a cylindrical side wall 75, whereas the outer cupped member 72 has a bottom wall 76 and stepped side walls 77 and 78 interconnected by an annular wall 79 in a plane parallel to the plane of the bottom wall 76 and substantially coincident with the plane of the bottom wall 74.

The end sections 24 at the opposite end of the conveyor are formed in a similar manner from a circular blank, generally designated 80 (Figures 7 and 8). The latter is of cupped shape with a bottom 81 having a central hole 82 therein, a cylindrical side wall 83 perpendicular to the bottom wall 81, an outer cylindrical wall 83, and an annular portion or wall 85 interconnecting the walls 84 and 83. The blank 80, like the blank 60, is cut diametrically along the line 86 to form a pair of oppositely-facing end sections.

The junction sections 28 and 29 are cut from a circular blank 90 (Figures 14 and 15) which consists of a circular central portion 91, an inner side wall 92, an inner radial wall 93 extending outwardly to the inner wall 94 of an inner channel portion 95, the bottom wall 96 of which is connected by its outer wall 97 to an outer radial wall 98 of annular shape. The outer edge of the annular radial wall 98 is connected to the inner wall portion 99 of an outer channel portion 100, the bottom wall 101 of which is connected by the outer side wall portion 102 to a narrow radial flange 103 which in turn is connected to a narrow axial flange 104. The radial portions 93, 98 and 103 lie in substantially the same plane and the central wall portion 91 is offset transversely to one side thereof whereas the channel wall portions 94 and 101 are offset transversely to the other side thereof but lie in the same plane with one another. The junction sections 28 and 29 are cut from the blank 90 along radial cutting lines 105 and 106 (Figure 14) so that the portions 28 and 29 are roughly sector-shaped or the shape of a piece of pie with the tip cut off on an arcuate line.

The various sections 23 to 29 formed in the foregoing manner, are assembled end-to-end as shown in Figures 11 and 12 into the two oppositely-facing side units 21 and secured to one another as by end-to-end welding operations. The side units or assemblies 21 are additionally reinforced near their ends by members 107 disposed at or near the meeting points of the sections 23—25 and 24—26 (Figures 10 and 11). The side units or assemblies 21 are then welded or otherwise secured to one another by the cross members 22, which may be of angle or channel cross-section, as desired. When this is done, the conveyor supporting structure 20 provides opposite side units 21 with race-track-shaped runways for conveyor rollers disposed in endless aligned paths.

The endless conveyor unit 19 mounted in the supporting structure 20 is driven by a pair of sprockets 110 keyed or otherwise drivingly secured to a shaft 111 which is journaled in flanged bearing bushings 112 secured as at 113 to adjusting slides 114 slidably mounted on opposite sides of the conveyor supporting structure 20. In particular, the adjusting slides 114 are provided with aligned spaced slots 115 by which they are bolted as at 116 to elongated rectangular supporting plates 117 welded in the space between the wall portions 32 and 33 (Figure 3) of the sections 26. The plates 117 however are spaced away from the inner ends of the end portions 24 so as to provide a gap therebetween for the passage of the shaft 111, as shown in Figures 2 and 11. Each slide 114 and its respective plate 117 are provided with parallel upstanding portions 118 and 119, respectively, the former serving as an abutment for the end of a cap screw 120 threaded through a threaded bore 121 in the latter and locked in position by a lock nut 122. The construction just described provides means for taking up slack in the endless conveyor unit 19. The sprocket shaft 111 is rotated by a drive sprocket 123 pinned or otherwise drivingly secured to the outer end thereof (Figure 1).

The endless conveyor unit 19 consists of a multiplicity of plates 130 having cylindrical axle-receiving portions or hinge portions 131 and 132 at their opposite edges. The hinge portions 131 of one plate 130 interlock with the hinge portions 132 of the adjacent plate 130 and are linked together by an axle 133 passing therethrough and carrying rollers 134 at the opposite ends thereof held in place by retaining elements 135 such as cotter pins and washers (Figure 3). Disposed between each axle 133 and the hinge portions 131, 132 is a sleeve 136 of elastic deformable material, such as rubber or synthetic rubber, preferably bonded thereto so as to flex as the plates 130 pass around the sprockets 110 at one end of the conveyor or around the runways in the end sections 23 at the opposite end of the conveyor. Side wings 137 of angle cross-section are disposed at the opposite sides of the conveyor 19 in overlapping relationship to prevent conveyed material from falling off the sides of the conveyor.

In the operation of the invention, let it be assumed that the endless conveyor 19 has been assembled in the manner shown in Figures 1, 2 and 3 with its rollers 134 travelling in the channelways provided in the above-described manner in the end sections 23 and 24, straight sections 25, 26 and 27 and junction sections 28 and 29. When power is applied to rotate the drive sprocket 123, as by a sprocket chain connected to a conventional driving unit (not shown) ordinarily consisting of an electric motor and reduction gearbox, the consequent rotation of the shaft 111 and sprockets 110 causes the endless conveyor unit 19 to travel in an orbital path as shown in Figure 2. If the conveyor is used to transfer materials from one horizontal level to another at a different height, as in Figure 11, then the orbital path includes the channelways in the inclined sections 27. The side units 21, because of their integral construction, are very rigid and the entire supporting structure 20 is also very rigid. The channelways, in addition to providing runways for the rollers 134, also serve as reinforcing ribs to strengthen the various sections 23 to 29 inclusive, in which they are formed, so that additional rigidity is imparted to the side units 21 for that reason.

As previously stated the side structures 21 formed in this manner according to the invention are cheaper to manufacture because of the economy of material used and because of the relatively low cost shaping operations required in bending or spinning the sheet metal into the various sections. The fact that each of the circular blanks 60 and 80 forms a pair of oppositely-facing end sections 23 or 24 also reduces the cost of the construction. Furthermore, the side units 21 by being formed of sheet metal constitute their own shields or housings for protecting the moving parts from dirt or damage as well as protecting the operator from injury by coming into contact with the moving parts.

What I claim is:

1. A fabricated sheet metal housing, supporting and roller guide track side structure for an endless conveyor having sustaining rollers at the opposite edges thereof, said structure comprising an elongated intermediate section including an elongated central plate section having laterally spaced substantially parallel elongated roller channels integral therewith and having bottom walls and substantially parallel side walls extending from end to end thereof along the opposite longitudinal edges thereof; and approximately semi-circular end sections secured to the opposite ends of said elongated section, each end section having therein an approximately semi-circular roller channel disposed with its opposite ends aligned with the opposite ends of the roller channels in the adjacent section.

2. A fabricated sheet metal housing, supporting and roller guide track side structure for an endless conveyor having sustaining rollers at the opposite edges thereof, said structure comprising an elongated intermediate section including an elongated horizontal and inclined portions and an arcuate junction portion therebetween, said portions being secured to and aligned with one another, said portions having spaced substantially parallel elongated roller channels integral therewith and having bottom walls and substantially parallel side walls extending from end to end thereof along the opposite longitudinal edges thereof; end sections secured to the opposite ends of said elongated section, each end section having therein an approximately semi-circular roller channel disposed with its opposite ends aligned with the opposite ends of the roller channels in the adjacent section, said channels in each side structure facing inwardly toward the corresponding channels in the opposite side structure.

3. A fabricated sheet metal housing, supporting and roller guide track side structure for an endless conveyor having sustaining rollers at the opposite edges thereof, said structure comprising an elongated intermediate section including a pair of longitudinally-separated elongated sections disposed in laterally-offset relationship, an inclined section aligned with and interconnecting said elongated sections, and junction sections disposed between the opposite ends of said inclined section and said elongated sections, each of said elongated sections and said inclined section including an elongated central plate having aligned spaced substantially parallel elongated roller channels integral therewith and having bottom walls and substantially parallel side walls extending from end to end thereof along the opposite longitudinal edges thereof; and end sections secured to the opposite ends of said elongated section, each end section having therein an approximately semi-circular roller channel disposed with its opposite ends aligned with the opposite ends of the roller channels in the adjacent section.

4. A fabricated sheet metal housing, supporting and roller guide track side structure for an endless conveyor having sustaining rollers at the opposite edges thereof, said structure comprising an elongated intermediate section including a pair of longitudinally-separated elongated sections disposed in laterally-offset relationship, an inclined section aligned with and interconnecting said elongated sections, and junction sections disposed between the opposite ends of said inclined section and said elongated sections, each of said elongated sections and said inclined section including an elongated central plate having aligned spaced substantially parallel elongated roller channels integral therewith and having bottom walls and substantially parallel side walls extending from end to end thereof along the opposite longitudinal edges thereof; and approximately semi-circular end sections secured to the opposite ends of said elongated section, each end section having therein an approximately semi-circular roller channel disposed with its opposite ends aligned with the opposite ends of the roller channels in the adjacent section, said junction sections having spaced arcuate roller channels therein aligned with the roller channels in said elongated and inclined sections.

5. A fabricated sheet metal housing, supporting and roller guide track side structure for an endless conveyor having sustaining rollers at the opposite edges thereof, said structure comprising an elongated intermediate section including an elongated section having spaced substantially parallel elongated roller channels integral therewith and having bottom walls and substantially parallel side walls extending from end ot end thereof along the opposite longitudinal edges thereof; and approximately semi-circular end sections secured to the opposite ends of said elongated section, each end section having therein an approximately semi-circular roller channel disposed with its opposite ends aligned with the opposite ends of the roller channels in the adjacent section, one of said end sections having a cupped semi-circular member secured thereto with a semi-cylindrical side wall forming one wall of the roller channel thereof.

6. A fabricated sheet metal housing, supporting and roller guide track side structure for an endless conveyor having sustaining rollers at the opposite edges thereof, said structure comprising an elogated intermediate section including an elongated section having spaced substantially parallel elongated roller channels integral therewith and having bottom walls and substantially parallel side walls extending from end to end thereof along the opposite longitudinal edges thereof; and approximately semi-circular end sections secured to the opposite ends of said elongated section, each end section having therein an approximately semi-circular roller channel disposed with its opposite ends aligned with the opposite ends of the roller channels in the adjacent section, said elongated section having a channel member secured thereto with parallel flanges forming the inner walls of said roller channels.

References Cited in the file of this patent

UNITED STATES PATENTS

| | | |
|---|---|---|
| 707,614 | McCabe | Aug. 26, 1902 |
| 2,231,709 | Dunlop | Feb. 11, 1941 |
| 2,305,009 | Jarrett et al. | Dec. 15, 1942 |
| 2,590,802 | Tramblay | Mar. 25, 1952 |